United States Patent [19]
Merle et al.

[11] Patent Number: 6,023,058
[45] Date of Patent: Feb. 8, 2000

[54] PHOTOSENSITIVE DETECTOR AND MOSAIC OF PHOTOSENSITIVE DETECTORS FOR THE DETECTION OF LUMINOUS FLASHES AND APPLICATIONS

[75] Inventors: Jean-Pierre Merle, Orsay; Thierry Solenne, Bures sur Yvette; Yang Ni, Les Ulis; Francis Devos, La Ville du Bois, all of France

[73] Assignee: Aerospatiale Societe Nationale Industrielle, Paris, France

[21] Appl. No.: 08/936,658

[22] Filed: Sep. 24, 1997

[30] Foreign Application Priority Data

Sep. 25, 1996 [FR] France ................................ 96 11656

[51] Int. Cl.$^7$ .............................. H01J 40/14; F41G 7/26
[52] U.S. Cl. .................................. 250/208.2; 250/214 A; 250/214 AG; 250/203.1; 250/203.6; 348/113; 348/116; 348/117; 244/3.16; 244/3.17
[58] Field of Search .................... 250/208.1, 208.2, 250/208.3, 214 R, 214 AG, 214 RC, 214 A, 338.1, 338.4, 339.01, 339.02, 203.1, 203.2, 203.6; 348/113, 116, 117, 164, 162; 244/3.15, 3.16, 3.17

[56] References Cited

U.S. PATENT DOCUMENTS

| | | | |
|---|---|---|---|
| 3,736,061 | 5/1973 | Knowlden et al. | 356/141 |
| 3,921,154 | 11/1975 | Barkley | 356/157 |
| 3,970,990 | 7/1976 | Carson | 250/208 |
| 4,131,248 | 12/1978 | Berglund | 244/3.16 |
| 4,143,835 | 3/1979 | Jennings, Jr. et al. | 244/311 |
| 4,174,177 | 11/1979 | Gardner et al. | 244/3.16 |
| 4,274,609 | 6/1981 | Ferrier et al. | 244/3.14 |
| 4,424,943 | 1/1984 | Zwirn et al. | 244/3.11 |
| 4,476,494 | 10/1984 | Tugaye | 244/3.17 |
| 4,537,370 | 8/1985 | Pizzurro | 244/3.16 |
| 4,587,426 | 5/1986 | Munier et al. | 250/338.4 |
| 4,607,287 | 8/1986 | Endo et al. | 358/213 |

(List continued on next page.)

FOREIGN PATENT DOCUMENTS

| | | |
|---|---|---|
| 0 499 319 | 8/1992 | European Pat. Off. . |
| 0 508 905 | 10/1992 | European Pat. Off. . |
| 0 633 457 | 1/1995 | European Pat. Off. . |
| 0 770 884 | 5/1997 | European Pat. Off. . |
| 3338191 | 2/1988 | Germany . |
| 86 07162 | 12/1986 | WIPO . |

OTHER PUBLICATIONS

U.S. Application Serial No. 08/936,779, filed Sep. 24, 1997 and entitled "Homing Head For A Flying Body".

French Search Report dated Apr. 6, 1997, 3 pages.

*Primary Examiner*—John R. Lee
*Attorney, Agent, or Firm*—Marshall, O'Toole, Gerstein, Murray & Borun

[57] ABSTRACT

A photosensitive detector (1) for detecting luminous flashes (2) is provided with a photosensitive diode (3) which is linked to a positive voltage and to ground via a resistor R1 and which is capable of transforming the luminous flashes into electrical signals and a circuit (4) that processes the electrical signals generated by the photosensitive diode (3). The circuit (4) causes electrical signals which correspond to luminous flashes (2) received by the photosensitive diode (3) and which exhibit a fast rise time to be strengthened, and the circuit (4) causes electrical signals which correspond to luminous flashes (2) received by the photosensitive diode (3) and which vary more slowly in intensity to be attenuated. The circuit (4) is linked directly to the photosensitive diode (3) and includes a differentiator circuit. The differentiator circuit has a differential amplifier (5) with a non-inverting input linked to a connection point situated between the photosensitive diode and the resistor R1, an inverting input linked to ground via a capacitor and to the connection point via a resistor Rx, and an output, and the differential amplifier (5) also has a resistor R2 linked to a connection point between the capacitor and the inverting input.

18 Claims, 4 Drawing Sheets

U.S. PATENT DOCUMENTS

| | | | |
|---|---|---|---|
| 4,609,824 | 9/1986 | Munier et al. | 348/164 |
| 4,671,650 | 6/1987 | Hirzel et al. | 356/28 |
| 4,777,651 | 10/1988 | McCann et al. | 382/21 |
| 4,871,251 | 10/1989 | Preikschat et al. | 356/336 |
| 5,142,142 | 8/1992 | Senechalle et al. | 250/227.23 |
| 5,187,476 | 2/1993 | Hamer | 340/906 |
| 5,229,594 | 7/1993 | Vilaire et al. | 250/206.2 |
| 5,279,150 | 1/1994 | Katzer et al. | 73/61.66 |
| 5,280,167 | 1/1994 | Dubois | 250/214 |
| 5,323,987 | 6/1994 | Pinson | 244/3.16 |
| 5,341,142 | 8/1994 | Reis et al. | 342/62 |
| 5,430,290 | 7/1995 | Merle et al. | 250/208.1 |
| 5,665,959 | 9/1997 | Fossum et al. | 250/208.1 |

PHOTOSENSITIVE DETECTOR AND MOSAIC OF PHOTOSENSITIVE DETECTORS FOR THE DETECTION OF LUMINOUS FLASHES AND APPLICATIONS

BACKGROUND OF THE INVENTION

The present invention relates to a photosensitive detector for detecting luminous flashes, and to a mosaic of photosensitive detectors including a plurality of such photosensitive detectors, as well as to several applications of said mosaic of photosensitive detectors.

A particularly interesting application of a mosaic of photosensitive detectors relates to a device for detecting, and possibly locating, a luminous source emitting specified luminous flashes.

The major drawback, when implementing such a device, resides in the presence, in addition to the luminous flashes emitted by the luminous source which it is desired to detect, of strong illumination, especially that from the sun and from flares, which forms luminous background noise, often making it very difficult to detect said sought-after luminous flashes.

It may even happen that the luminous background noise is so large that it almost completely swamps the luminous signal which it is desired to detect.

It is noted that the document FR-A-2 583 523, which discloses a system which includes photosensitive detectors arranged in rows and columns in matrix form, for locating a mobile emitting luminous flashes, makes provision, in order to remedy this drawback, for associating a comparison device with said system. This comparison device makes it possible to record the background noise, either just before or just after detection, and to subtract this recorded background noise from the detected signal containing the sought-after luminous flashes.

However, the frequency of detection is reduced for this system. Thus, each duration of detection demands an identical duration for the recording of the background noise which is to be subtracted and the subtraction time is lengthy since this subtraction is not incorporated with detection and is done only after the reading of the images.

SUMMARY OF THE INVENTION

The object of the present invention is to remedy these drawbacks. It relates to a photosensitive detector which makes it possible to detect luminous flashes, irrespective of the intensity of the background noise, i.e. even for very large background noise.

To this end, according to the invention, said photosensitive detector for detecting luminous flashes, which includes a photosensitive diode capable of transforming the luminous energy received into an electrical current or electrical signal, is noteworthy in that it furthermore includes a means of processing the electrical signals generated by said photosensitive diode, comprising said means of processing a differentiator electrical circuit which:

on the one hand, strengthens the electrical signals exhibiting a fast rise time and corresponding to a sought-after luminous flash received by the photosensitive diode; and on the other hand, attenuates the electrical signals corresponding to illuminations which vary more slowly in intensity, of said photosensitive diode.

Thus, by virtue of the invention, it is possible clearly to discern a short luminous flash, relative to the luminous background noise, this making it possible to detect, accurately, luminous flashes of reduced intensity relative to said background noise.

The present invention is, thereby, particularly well suited to the detection of low-intensity luminous pulses emitted by a luminous source, especially a laser source, which may be situated a large distance away.

It will be noted that the present invention, by carrying out differentiation of the electrical signal generated, goes counter to the usual practice which consists in integrating the low-energy signals, during their processing, and not in differentiating them.

Advantageously, said means of processing electrical signals is an electrical circuit with a differential amplifier.

In the case in which said photosensitive detector is intended for detecting luminous flashes lying within a specified frequency band, advantageously, the photoelectric sensitivity of said photosensitive diode is optimized over said frequency band.

Moreover, the photosensitive detector in accordance with the invention additionally includes:

a means of binarization making it possible to determine a binary state of said photosensitive detector, as a function of the signal formed by said means of processing electrical signals, namely for example the 1 state when a luminous flash is detected and the 0 state otherwise; and a means of storage making it possible to record said specified binary state.

The present invention also relates to a mosaic of photosensitive detectors which is noteworthy in that it includes photosensitive detectors in accordance with the invention and arranged in rows and columns in matrix form.

Advantageously, said mosaic photosensitive detectors includes a monitoring system making it possible to detect a characteristic variation in illumination, which is greater than a predefined variation, of at least one of said photosensitive detectors.

In a first advantageous embodiment, said monitoring system monitors the electrical current consumed by each of said photosensitive detectors, any increase in said consumed electrical current, which is greater than a predefined increase, indicating a characteristic variation in illumination.

Furthermore, in a second advantageous embodiment, said monitoring system monitors the binary state of said photosensitive detectors, so that any change of the binary state to a state representative of the detection of a luminous flash (namely from the 0 state to the 1 state) indicates a characteristic variation in illumination.

For this purpose, according to the invention, said monitoring system includes a first network of shift registers, capable of transmitting said binary state of all the photosensitive detectors of the mosaic of photosensitive detectors.

In a particularly advantageous embodiment of the invention, said mosaic of photosensitive detectors is formed in such a way as to be able to identify a luminous source emitting luminous flashes at predefined time intervals. In this case, advantageously, said mosaic of photosensitive detectors includes an identification system which:

measures the time interval between two successive detected characteristic variations in illumination;

compares the time interval thus measured with the predefined time interval of emission of said luminous source; and identifies as appropriate, on the basis of this comparison, said luminous source.

Furthermore, said mosaic of photosensitive detectors in accordance with the invention also advantageously includes a locating system making it possible to locate in the matrix of the mosaic of photosensitive detectors the position of each photosensitive detector which detects a luminous flash.

Preferably, said locating system includes:

a second network of shift registers, which can be integral with the monitoring system, making it possible to transmit in series in a predefined order the binary state of all the photosensitive detectors, the order of each photosensitive detector in the transmission series being representative of its position in the matrix; and/or a means of calculation making it possible to determine a central position from the located positions of all the photosensitive detectors having detected a luminous flash.

In a particularly advantageous implementation of the invention, said locating system:

determines the intensity of the signal generated by the means of processing of each of the photosensitive detectors having detected a luminous flash;

determines, in the matrix of the mosaic of photosensitive detectors, the position of each of said photosensitive detectors having detected a luminous flash; and calculates, from the intensities and positions thus determined, the corresponding barycenter which represents the sought-after location.

Furthermore, the present invention relates to various practical applications using a mosaic of photosensitive detectors such as that described above.

A first application relates to a device for detecting luminous flashes which includes a detection assembly formed of a mosaic of photosensitive detectors in accordance with the invention and of a means of focusing which focuses all the luminous radiation lying within its field of view onto said mosaic of photosensitive detectors.

In a variant of said first application, said detection device advantageously includes a plurality of detection assemblies, preferably six detection assemblies, which are arranged side by side in a circle, so that the union of their fields of view allows detection of luminous flashes, horizontally in all directions.

A second advantageous application relates to a homing head for a flying body, which is intended to guide said flying body towards a luminous source and which includes, in particular:

a luminous source locating system;

a source of inertial information; and an information processing unit.

According to the invention, said homing head is noteworthy in that said luminous source locating system includes a mosaic of photosensitive detectors in accordance with the invention, which is arranged fixedly on said flying body, in order to locate a luminous source emitting luminous flashes.

DESCRIPTION OF THE DRAWINGS

The figures of the appended drawing will clarify the manner in which the invention may be embodied. In these figures, identical references denote similar elements.

DETAILED DESCRIPTION OF THE PREFERRED EMBODIMENTS

Figure 1:
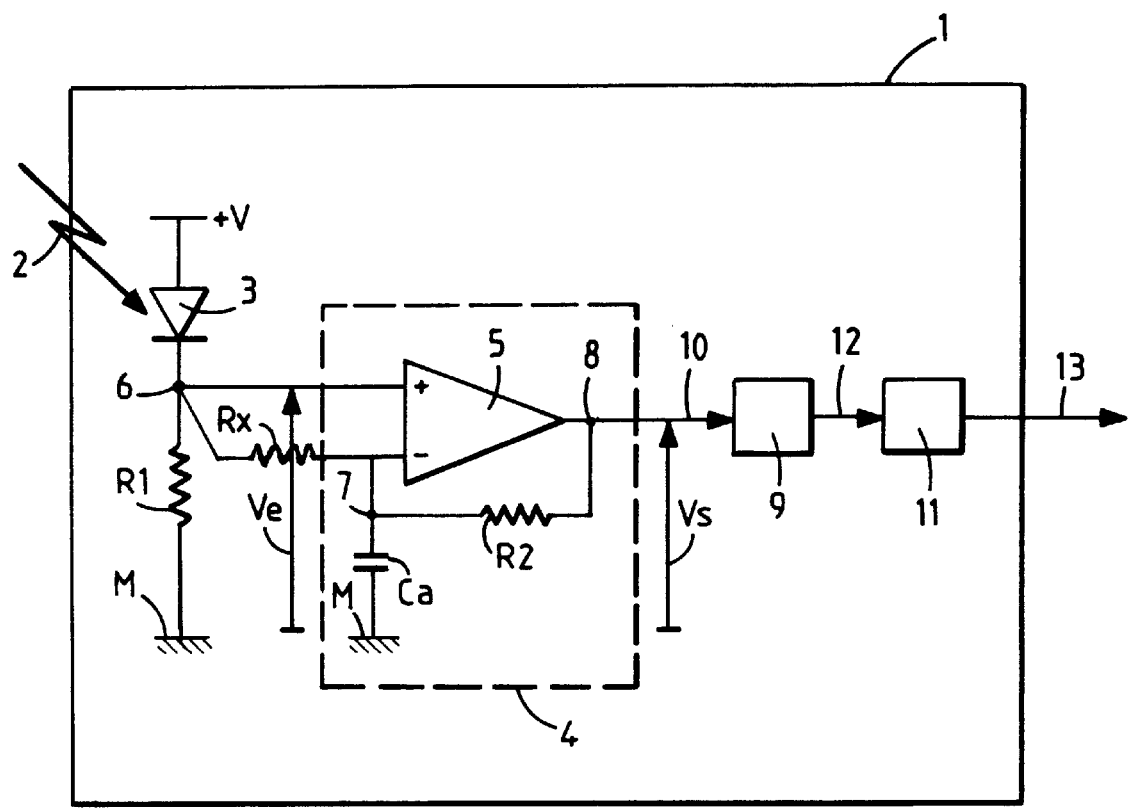
FIG. 1 diagrammatically illustrates a photosensitive detector in accordance with the invention.

The photosensitive detector 1 in accordance with the invention and represented diagrammatically in FIG. 1 is intended to detect luminous flashes 2, emitted, for example, from a laser source.

For this purpose, said photosensitive detector 1 includes, according to the invention:

a photosensitive diode 3 which is linked, on the one hand, to a positive voltage +V and, on the other hand, to ground M via a resistor R1, and which is capable of transforming the luminous energy received into an electrical signal; and a means 4 of processing the electrical signals generated by the photosensitive diode 3.

Said means 4 is embodied in the form of a differentiator electrical circuit, of known type, including:

a differential amplifier 5, whose non-inverting input (+) is linked to a connection point 6 situated between the photosensitive diode 3 and the resistor R1 and whose inverting input (−) is linked, on the one hand, to ground M via a capacitor Ca and, on the other hand, to the connection point 6 via a resistor Rx; and a resistor R2 linked, on the one hand, to a connection point 7 between the capacitor Ca and the inverting input (−) and, on the other hand, to the output 8 of the differential amplifier 5.

Figure 2:
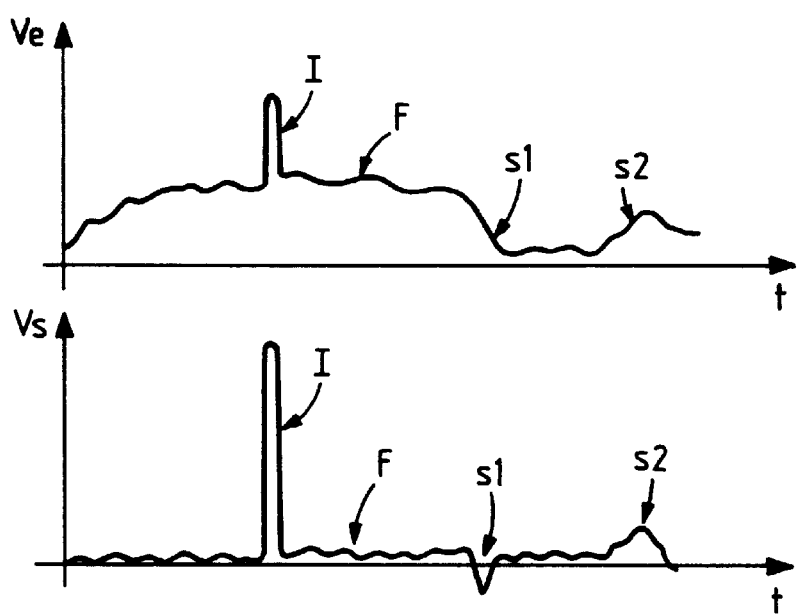
FIG. 2 illustrates the processing of an electrical signal by a means of processing of a photosensitive detector in accordance with the invention.

During the illumination of the photosensitive diode 3, said means of processing 4 transforms the electrical signal generated by said photosensitive diode 3 and represented in the form of a voltage Ve in FIGS. 1 and 2, into a processed signal represented in the form of a voltage Vs. As may be seen in FIG. 2, by comparing the diagrams respectively illustrating the variations in said voltages Ve and Vs, as a function of time t, the processing of the means of processing 4 is such that:

on the one hand, it strengthens the electrical signals I exhibiting a rapid rise time and corresponding to a luminous flash 2 detected by the photosensitive diode 3. It also discerns the relatively abrupt variations s1 and s2 in the luminous background noise F; and on the other hand, it attenuates the electrical signals exhibiting a slower time variation and corresponding to illuminations which vary more slowly in intensity, i.e. essentially the luminous background noise F.

Thus, by virtue of the invention, it is possible clearly to discern short pulses within the luminous background noise F, this making it possible to detect, accurately, luminous flashes 2 of reduced intensity relative to said luminous background noise F. The photosensitive detector 1 thus makes it possible, in particular, to detect low-intensity pulses emitted by a laser source situated a large distance away from said photosensitive detector 1.

According to the invention, said photosensitive detector 1 additionally includes, as represented diagrammatically in FIG. 1:

a means of binarization 9 which is linked by a link 10 to the output 8 of the differential amplifier 5 and which compares said voltage Vs at the output 8 with a reference voltage Vo and allocates, depending on the result, a 0 binary state (if Vs is less than Vo) or 1 binary state (if Vs is greater than Vo) to said photosensitive detector 1; and a means of storage 11 which is linked to the binarization means 9 by a link 12, which records the binary state determined by the latter means and which can transmit this information via a link 13.

Figure 3:
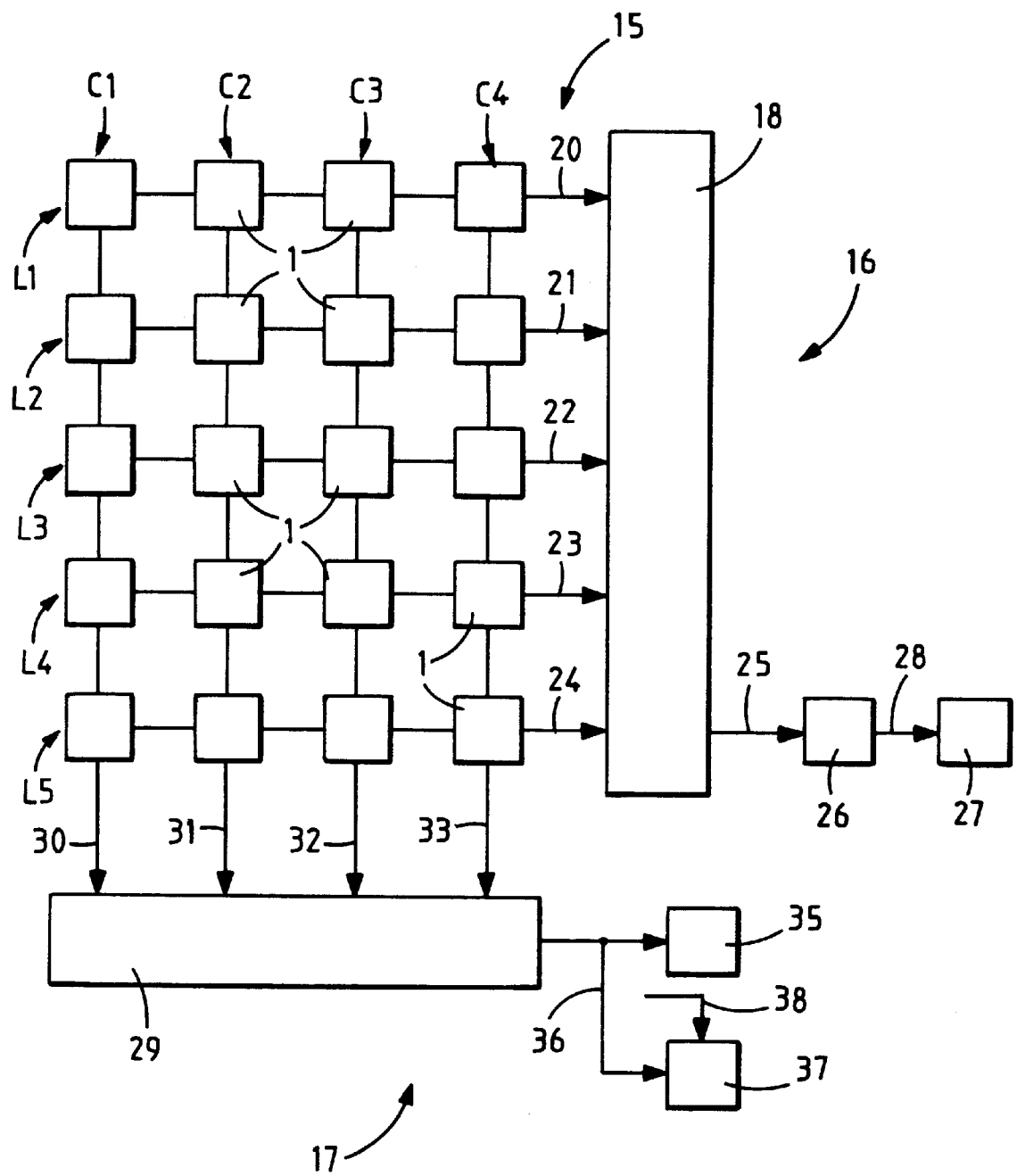
FIG. 3 diagrammatically illustrates a mosaic of photosensitive detectors in accordance with the invention.

The present invention also relates to a mosaic of photosensitive detectors 15, as represented in FIG. 3, including photosensitive detectors 1 arranged in matrix form.

Said photosensitive detectors 1 are linked together in rows L1, L2, L3, L4, L5 and columns C1, C2, C3, C4.

According to the invention, said mosaic of photosensitive detectors 15 additionally includes:

a monitoring system 16 explained below, making it possible to pinpoint in time the luminous flashes 2 arriving at said matrix of photosensitive detectors 1; and a locating system 17 likewise explained below, making it possible to locate in said matrix the position of the photosensitive detectors 1 which detect luminous flashes 2 so as to be able to evaluate the direction of the source emitting said luminous flashes 2.

According to the invention, said monitoring system 16 detects any variation in illumination of one of said photosensitive detectors 1, which is greater than a predefined value and which is characteristic of the illuminating of said photosensitive detector 1 by a luminous flash 2.

In the embodiment represented in FIG. 3, said monitoring system 16 monitors the binary state of all the photosensitive detectors 1, so that any change of state, from the 0 state to the 1 state, is regarded as a characteristic variation in illumination, i.e. is representative of the detection of luminous flash 2.

To do this, said monitoring system 16 includes:

a network 18 of shift registers respectively linked to the rows L1, L2, L3, L4 and L5 by links 20 to 24, said network 18 making it possible to forward, via a link 25, row by row, the binary state of each of the photosensitive detectors 1; and a means 26 of evaluating and extracting the binary state of the photosensitive detectors 1, which is linked to the link 25 and makes it possible to extract the states 1 representative of a detection of luminous flashes 2.

In another embodiment (not represented), the monitoring system is formed in such a way as to monitor the electrical current consumed by the assembly of said photosensitive detectors 1, any increase in said electrical current consumed, which is greater than a predefined increase, then indicating a characteristic variation in illumination of at least one of said photosensitive detectors.

Said mosaic of photosensitive detectors 15 includes, additionally, an identification system 27 associated with the monitoring system 16 and linked via a link 28 to the means 26, for identifying a luminous source which emits luminous flashes 2 at constant and predefined time intervals T.

For this purpose, said identification system 27:

records and logs any characteristic variation in illumination;

measures the time interval between two successive or otherwise detected characteristic variations in illumination;

compares the time interval thus measured with the predefined time interval T of emission of luminous flashes by the luminous source to be identified; and identifies or does not identify the luminous source depending on this comparison, as will be seen in greater detail below with reference to FIG. 5.

Furthermore, the locating system 17 includes, according to the invention, a network 29 of shift registers respectively linked to the columns C1, C2, C3 and C4 of the matrix of the mosaic of photosensitive detectors 15 by links 30 to 33, said network 29 making it possible to transmit in series, in a predefined order, the binary state of all the photosensitive detectors 1, the order of each photosensitive detector 1 in the transmission series being representative of its position in said matrix.

Thus, it is possible to locate the position of any photosensitive detector exhibiting a 1 state.

Of course, it is possible for a single luminous flash 2 of large diameter to place several photosensitive detectors 1 in their 1 state. Also, in order to be able to carry out accurate locating in such a case, the locating system 17 additionally includes, according to the invention, a means of calculation 35 linked by a link 36 to the network 29 and determining a central position from the located positions of all the photosensitive detectors 1 which have detected a luminous flash 2.

Moreover, in a particularly advantageous embodiment, the locating system 17 additionally includes a means of calculation 37:

which receives:

via the divided link 36, the position of all the photosensitive detectors 1 having detected a luminous flash 2; and via a link 38, the intensity of the signal Vs generated by the means of processing 4 of each of said photosensitive detectors 1 having detected a luminous flash 2; and which calculates, from the intensities and positions thus received, the corresponding barycenter which represents the sought-after location.

The mosaic of photosensitive detectors 15 represented in FIG. 3 and specified above may be used in numerous optoelectronic devices, in particular devices for monitoring and locating luminous sources. By way of example, a few possible applications of this mosaic of photosensitive detectors 15 are described below.

Figure 4:
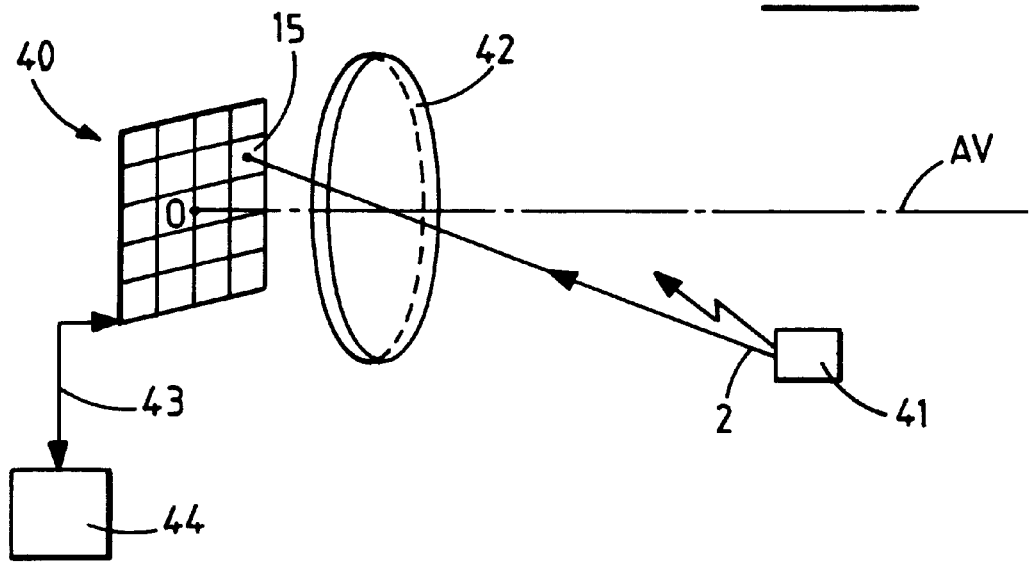
FIG. 4 shows a device for detecting and locating a source of luminous flashes.

A first possible application relates to a device for identifying and locating 40 a, for example mobile, pulsed luminous source 41, as represented in FIG. 4, which makes it possible to determine, relative to a sighting axis AV, the angular position of said luminous source 41.

For this purpose said device 40 includes a focusing means 42, observing the environment of the sighting axis AV, in which the source 41 is situated, and a mosaic of photosensitive detectors 15, with which is associated, via a link 43, a command unit 44 which controls in particular the aforesaid elements 16 and 17 of said mosaic of photosensitive detectors 15, which comprises, as appropriate, certain of these elements, and which receives and processes the results generated by them.

Said device 40 is particularly well suited to the identification and location of a luminous source 41 emitting luminous flashes 2 at predefined time intervals T.

Figure 5:
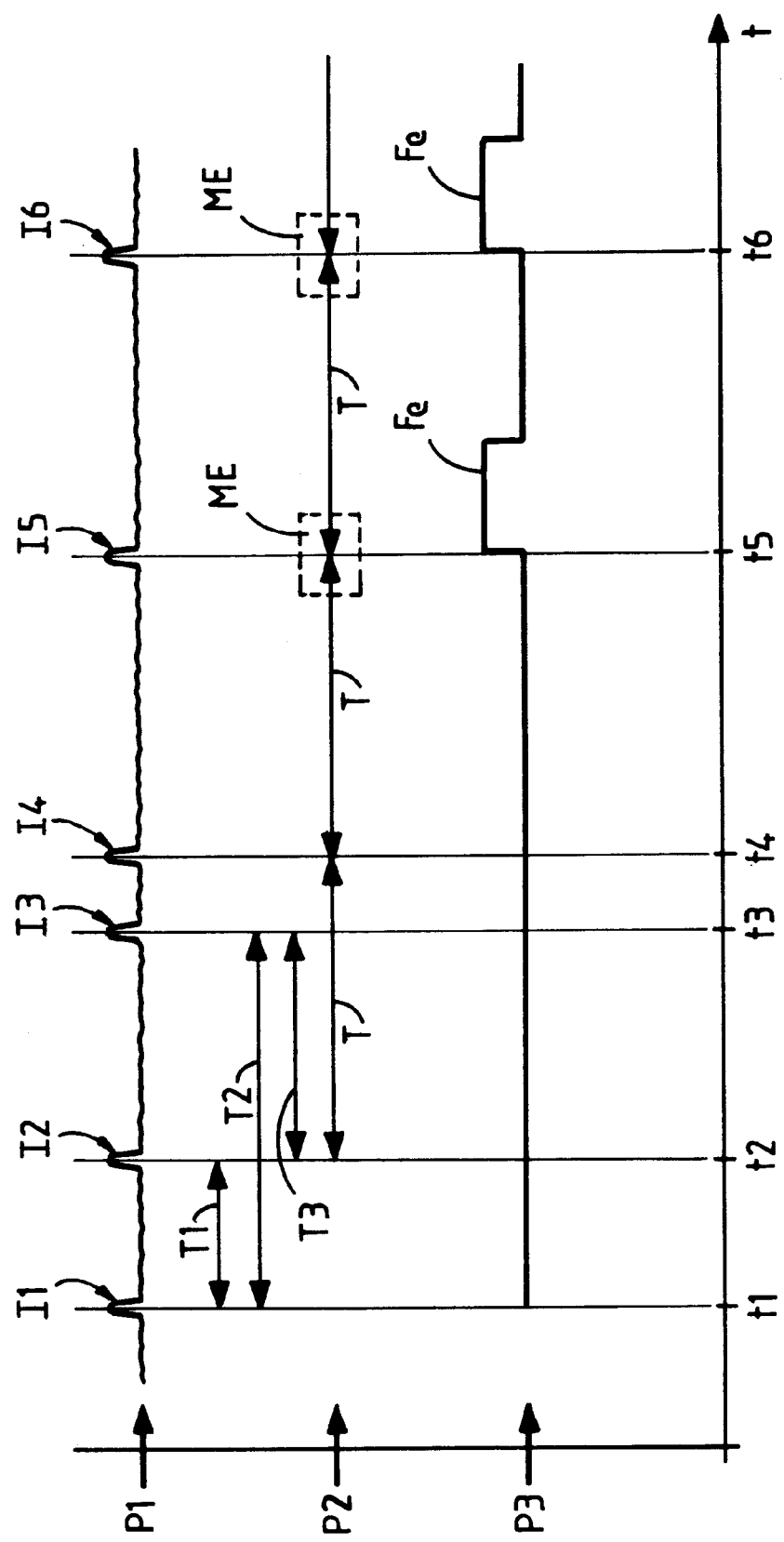
FIG. 5 illustrates the operations carried out over time during the implementation of the device of FIG. 4.

FIG. 5 is a diagram illustrating, as a function of time t, the various steps of such a procedure for identifying and locating a luminous source 41, by means of the device 40 (in the presence of nuisance luminous flashes).

Preferably, during detection, the monitoring I system 16 of the mosaic of photosensitive detectors 15 is on stand-by and the locating system 17 is idle (the direction of origin of the luminous flashes being a priori unknown).

Represented on a line P1 of FIG. 5 are the various illuminations I1 to I6 detected versus time t respectively at instants t1 to t6, by the mosaic of photosensitive detectors 15 and corresponding to luminous flashes 2 received, either from the sought-after luminous source 41 or from nuisance luminous sources (not represented).

Illustrated on a line P2 is the identifying, by means of the monitoring system 16, from among all the detected illuminations I1 to I6, those which originate from the luminous source 41, i.e. those which are separated by a time T. As, on the one hand, the durations T1 between t1 and t2 and T3 between t2 and t3 are less than T, and as, on the other hand, the duration T2 between t1 and t3 is greater than T. the pairs I1/I2, I1/I3 and I2/I3 do not correspond to two successive illuminations from the source 41.

Conversely, the duration between the instants t2 and t4 is equal to T, taking account, of course, of the possible error margins. Having thus identified a pair of illuminations I2 and I4 from the source 41, it is possible to predict the instants t5, t6, . . . of the next illuminations I5, I6, . . . emitted by said source 41, at durations T, 2T, . . . after t4, to within a margin of errors ME.

The locating system 17 can then be activated during time windows Fe, at the instants t5, t6, . . . , as illustrated in a line P3, so that the system locates the direction of the target 41, in the manner described above.

In a particularly advantageous embodiment of the invention (and not described), the device 40 can be incorporated into a homing head of a flying body. In this case, the mosaic of photosensitive detectors 15 is arranged fixedly on the flying body and observes the space fore of the flying body, for example a missile. Said device 40 is then used to locate a target to be reached or to be destroyed, which is illuminated by a luminous beam, preferably a laser beam, emitted at regular time intervals, and which reflects said luminous beam towards the flying body.

Figure 6:
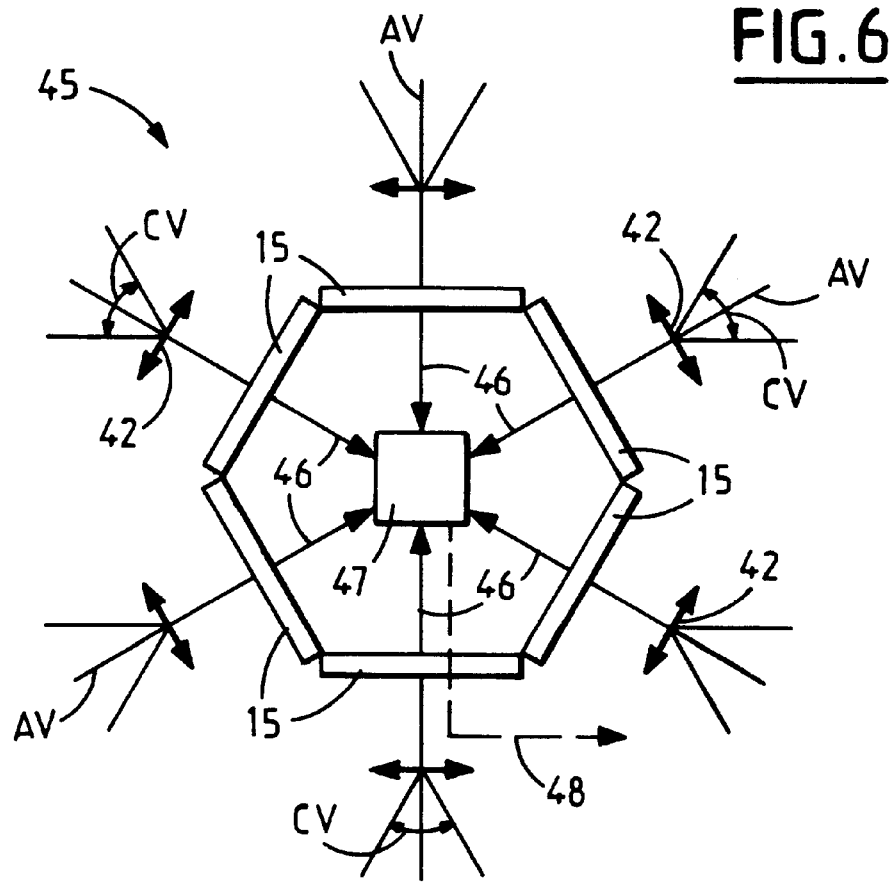
FIG. 6 diagrammatically shows a top view of a device making it possible to detect and locate single luminous flashes, horizontally in all directions.

Represented in FIG. 6 is a diagrammatic plan view of another application of the mosaic of photosensitive detectors 15, corresponding to a device 45 allowing detection of luminous flashes 2, horizontally in all directions.

Said device 45 includes a plurality of detection assemblies:

which are formed of a mosaic of photosensitive detectors 15 and of a focusing means 42;

which each exhibit a field of view CV centered on the corresponding sighting axis AV, in which detections may be carried out;

which are arranged side by side, in a circle so that the union of their fields of view CV allows detection of luminous flashes 2, horizontally in all directions; and which are respectively linked by links 46 to a command unit 47 which controls the detection and is capable of transmitting the results via a link 48.

In the preferred example represented in FIG. 6, said device 45 includes six detection assemblies 15, 42 arranged in hexagon form.

We claim:

1. A photosensitive detector (1) for detecting luminous flashes (2), comprising:

a photosensitive diode (3) which is linked to a positive voltage and to ground via a resistor R1 and which is capable of transforming said luminous flashes into electrical signals;

a circuit (4) that processes said electrical signals generated by said photosensitive diode (3), said circuit (4) causing electrical signals which correspond to luminous flashes (2) detected by said photosensitive diode (3) and which exhibit a fast rise time to be strengthened, and said circuit (4) causing electrical signals which correspond to luminous flashes (2) detected by said photosensitive diode (3) and which vary more slowly in intensity to be attenuated, said circuit (4) being linked directly to said photosensitive diode (3) and including a differentiator circuit, said differentiator circuit comprising:

a differential amplifier (5) having a non-inverting input linked to a connection point situated between said photosensitive diode (3) and said resistor R1, having an inverting input linked to ground via a capacitor and to said connection point via a resistor Rx, and having an output; and a resistor R2 linked to a connection point between said capacitor and said inverting input and to said output of said differential amplifier (5).

2. The photosensitive detector as claimed in claim 1, for the detection of luminous flashes (2) lying within a specified frequency band, wherein said photosensitive diode (3) has a photoelectric sensitivity that is optimized over said frequency band.

3. The photosensitive detector as claimed in claim 1, additionally comprising a binarization circuit (9) operatively coupled to said circuit (4) that determines a binary state of said photosensitive detector (1) based on a signal generated by said circuit (4).

4. The photosensitive detector as claimed in claim 3, additionally comprising a storage means (11) operatively coupled to said binarization circuit (9) that records said binary state.

5. A photosensitive detection apparatus comprising a plurality of photosensitive detectors (1) as claimed in claim 1, said photosensitive detectors (1) being arranged in rows (L1 to L5) and columns (C1 to C4) to form a matrix.

6. The photosensitive detection apparatus as claimed in claim 5, additionally comprising a monitoring system (16) operatively coupled to at least one of said photosensitive detectors (1) that detects a characteristic variation in illumination, which is greater than a predefined variation, of at least one of said photosensitive detectors (1).

7. The photosensitive detection apparatus as claimed in claim 6, wherein said monitoring system (16) monitors the electrical current consumed by each of said photosensitive detectors (1), any increase in said consumed electrical current, which is greater than a predefined increase, indicating a characteristic variation in illumination.

8. The photosensitive detection apparatus as claimed in claim 6, wherein said monitoring system (16) monitors a binary state of each of said photosensitive detectors (1), with any change of said binary state to a state representative of a detection of a luminous flash (2) indicating a characteristic variation in illumination.

9. The photosensitive detection apparatus as claimed in claim 7, wherein said monitoring system (16) includes a first network (18) of shift registers which is capable of transmitting the binary state of said photosensitive detectors (1) of said matrix of photosensitive detectors (1).

10. The photosensitive detection apparatus as claimed in claim 6, said apparatus identifying a luminous source (41) emitting luminous flashes (2) at constant and predefined time intervals (T), and said apparatus including an identification system (27) which measures a time interval between two successive detected characteristic variations in illumination, compares said measured time interval with a predefined time interval (T) of emission of said luminous source (41) and identifies said luminous source (41) based on of said comparison.

11. The photosensitive detection apparatus as claimed in claim 5, additionally comprising a locating system (17) that locates, in said matrix of photosensitive detectors (1), the position of each photosensitive detector (1) which detects a luminous flash (2).

12. The photosensitive detection apparatus as claimed in claim 11, wherein said locating system (17) includes a second network (29) of shift registers, making it possible to transmit in series in a predefined order the binary state of said photosensitive detectors (1), the order of each photosensitive detector (1) in the transmission series being representative of its position in the matrix.

13. The photosensitive detection apparatus as claimed in claim 11, wherein said locating system (17) comprises calculation means (35) that determine a central position from the positions of said photosensitive detectors (1) that detected a luminous flash (2).

14. The photosensitive detection apparatus as claimed in claim 11, wherein said locating system (17) determines the intensity of a signal generated by said circuit (4) of each of said photosensitive detectors (1) that detected a luminous flash (2), determines the position in said matrix of each of said photosensitive detectors (1) that detected a luminous flash (2), and calculates a barycenter which represents the sought-after location based on the intensities and positions determined.

15. A device for detecting luminous flashes comprising a detection assembly (15, 42), comprising:

a matrix of photosensitive detectors (15) as claimed in claim 5; and a focusing means (42) having a field of view (CV) that focuses all the luminous radiation lying within said field of view (CV) onto said matrix of photosensitive detectors (15).

16. The device as claimed in claim 15, additionally comprising a plurality of detection assemblies (15, 42), each of said detection assemblies having a field of view (CV), said detection assemblies (15, 42) being arranged side by side in a circle so that the union of their fields of view (CV) allows detection of luminous flashes (2) horizontally in all directions.

17. The device as claimed in claim 16, wherein said device comprises six detection assemblies (15, 42) arranged in hexagon form.

18. A homing head for a flying body, intended to guide said flying body towards a luminous source, said homing head comprising:

a luminous source locating system;

a source of inertial information; and an information processing unit, wherein said luminous source locating system includes a matrix of photosensitive detectors (15) as claimed in claim 11 and arranged fixedly on said flying body, in order to locate luminous flashes (2) emitted by a luminous source.

* * * * *